H. MERRILL.
Filter.
No. 82,735.  Patented Oct. 6, 1868.
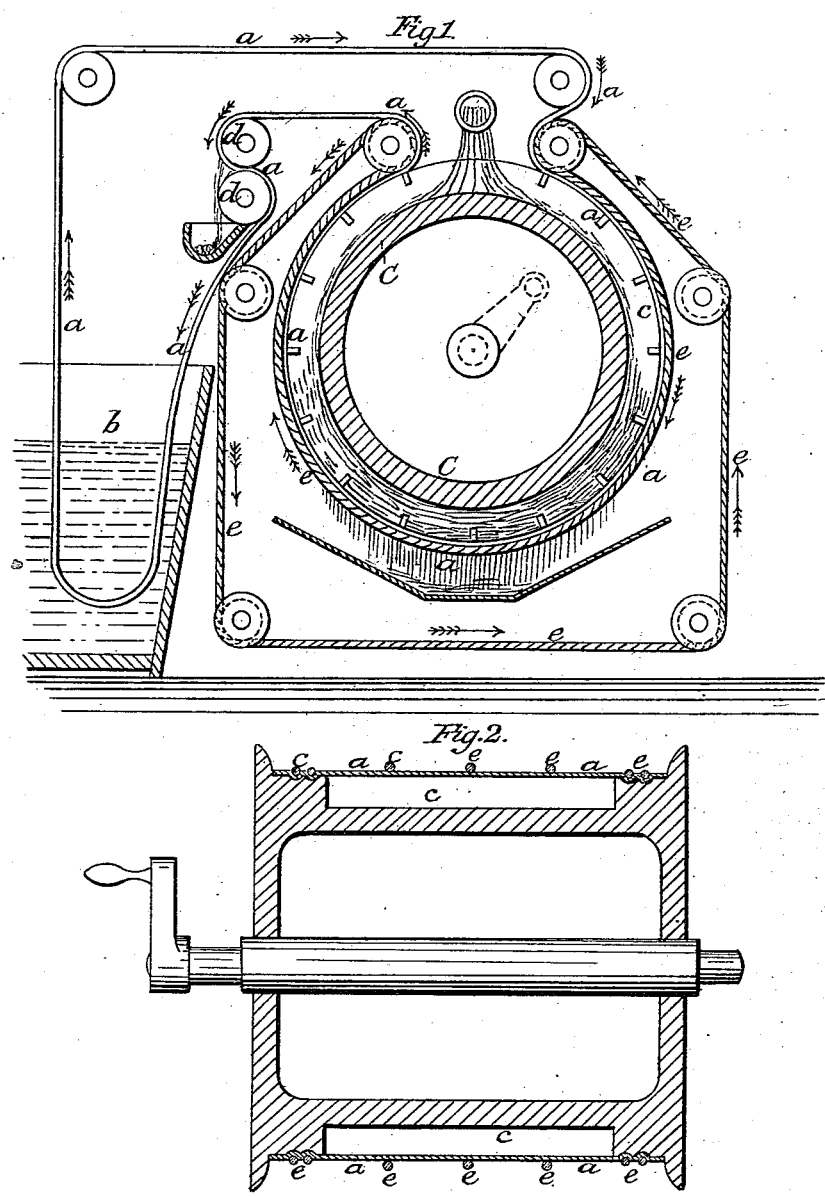

United States Patent Office.

HELEM MERRILL, OF NEW YORK, N. Y.

Letters Patent No. 82,735, dated October 6, 1868; antedated September 30, 1868.

IMPROVED FILTER FOR SACCHARINE AND OTHER LIQUIDS.

*The Schedule referred to in these Letters Patent and making part of the same.*

TO ALL WHOM IT MAY CONCERN:

Be it known that I, HELEM MERRILL, of New York, in the county and State of New York, have invented a certain new and useful Improvement in Filters; and I do hereby declare that the following is a full, clear, and exact description of the same, reference being had to the accompanying drawing, making a part of this specification, and to the letters of reference marked thereon.

The said invention relates more particularly to filters, of flannel, felt, or other textile material, such as are usually employed in sugar-making, and a portion of it is also applicable to other purposes.

The feculent matter that is separated from a solution in course of filtration, and deposited upon the surface of the filtering-material, and within its interstices, speedily interferes with its action, and requires the suspension of the operation that the filter may be cleansed. To obviate this delay, the object of my invention is to provide an arrangement of filtering-material by which only a portion of it may be in use at any one time, while the remainder may be outside of the filter being cleansed, the two portions being so connected that their relative positions may be gradually changed or reversed when required, so that the filter will be kept in continuous operation with clean filtering-surface and material.

To accomplish this object, the said invention consists of a hollow cylinder, with open or slatted sides, within which the solution to be filtered is placed. The cylinder is hung on journals, so that it may be revolved, and may be enclosed in a suitable case.

The filtering-cloth is made in the form of a continuous or endless belt or apron, a portion of which passes nearly around the cylinder, with its edges resting upon blank portions of its cylindrical surface, and the other is led out of the top of the filter and over guide-rollers to a washing-tank, where it may be cleansed and made ready for use on being again passed around the cylinder.

When the solution to be filtered is introduced to the cylinder, it flows through the open work of the cylindrical surface, and through the sheet of filtering-material, composed of one or more thicknesses, by which it is enclosed, and the rotation of the cylinder, which may be gradual and continuous, or at intervals, when required, causes the clean filtering-material to be drawn from the washing-tank at one side, and the discharge at the other of that portion which has become dirty, and is no longer fit for advantageous use.

The continuous motion of the cylinder continuously presents fresh filtering-material, and discharges that which has been in use, and also causes it to pass through squeezing-rollers or scrapers, by which the adhering accumulated sediment and saccharine matter may be separated and led to a suitable tank, while the apron proceeds onward to a water-cistern, where it may be thoroughly cleaned before it is in turn drawn again into the filter.

For the purpose of holding the apron of filtering-material firmly against the cylinder, and to perfect the joints at the edges, I employ belts of wire ropes, that pass around the cylinder outside the sheet of filtering-material, and move in conjunction with it until it leaves the filter, when they separate from it and complete their circuit by themselves, by means of suitable rollers, by which they are kept duly strained and guided.

To enable others skilled in the art to which it appertains to make and use my invention, I will proceed to describe its construction and operation with reference to the drawing.

Figure 1 is a transverse view of a filter arranged for sugar-making, and

Figure 2 is a longitudinal section of the cylinder, showing in transverse section the apron of filtering-material, and the belts by which it is held and supported.

The arrows indicate the direction of the motion of the several parts.

The apron of filtering-material, $a\ a$, passes from the washing-cistern $b$, over guide-rollers, and around the filtering-cylinder $c$, from which it is again taken by guide-rollers, and led to squeezing-rollers $d$, and back into the cistern. The wire belts $e$ likewise pass around the cylinder with the filtering-material, and then separate from it and pass around grooved rollers in the manner shown in the drawing. These belts may be kept strained by means of spring-journals on the guide-rollers, or by hanging pulleys, or by any other of the contrivances usually employed by mechanics for the purpose.

The belts that bind the outer edges of the apron compress it either into grooves or upon layers of India rubber, with which the ends of the cylinder may be provided.

The open work of the cylinder may be a wire sieve, and the belts supporting the apron may be made of wire gauze.

The cylinder may be turned by a crank, as represented, or the motion may be communicated through a belt-pulley, on one of the rollers, and steam may be introduced to the interior of the cylinder, through one of the journals, for the purpose of keeping it hot. It may also be furnished with an automatic apparatus, to keep the liquor at the desired height.

The endless supporting-belts, of wire or other strong material, may be applied to sustain and insure the uniform movements of aprons that are used in paper-making, and in the manufacture of morocco cloth, and for other purposes where it may be desirable to support a travelling-apron of comparatively weak material.

The details of the construction, whether applied to filters or other purposes, may be varied to suit the circumstances, but I prefer to use them substantially as herein described.

I claim as my invention—

1. The arrangement of the filtering-material, partly inside and partly outside the filter.

2. Operating a sheet of filtering-material so that it passes in and out of a filter, either continuously or at intervals, as may be required.

3. Supporting and securing a travelling-apron by means of endless belts, substantially as described.

HELEM MERRILL.

Witnesses:
 HENRY TORSTRICK,
 WM. KEMBLE HALL.